(12) United States Patent
Ziolek et al.

(10) Patent No.: US 10,464,446 B2
(45) Date of Patent: Nov. 5, 2019

(54) SMART MULTI-CONTOURED SEAT SUPPORT SYSTEM

(71) Applicants: Hyundai Motor Company, Seoul (KR); Kia Motors Corporation, Seoul (KR)

(72) Inventors: Scott Ziolek, Ann Arbor, MI (US); Amanda Christiana, Ann Arbor, MI (US)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 74 days.

(21) Appl. No.: 15/790,667

(22) Filed: Oct. 23, 2017

(65) Prior Publication Data

US 2019/0118674 A1    Apr. 25, 2019

(51) Int. Cl.
*B60N 2/02* (2006.01)
*B60N 2/66* (2006.01)

(52) U.S. Cl.
CPC ......... *B60N 2/0252* (2013.01); *B60N 2/0228* (2013.01); *B60N 2/0248* (2013.01); *B60N 2/665* (2015.04); *B60N 2002/0268* (2013.01)

(58) Field of Classification Search
None
See application file for complete search history.

(56) References Cited

U.S. PATENT DOCUMENTS

| | | | |
|---|---|---|---|
| 5,263,765 A | 11/1993 | Nagashima et al. | |
| 5,777,394 A * | 7/1998 | Arold | B60N 2/0228 307/10.1 |
| 6,055,473 A | 4/2000 | Zwolinski et al. | |
| 6,220,667 B1 | 4/2001 | Wagner | |
| 8,275,514 B2 | 9/2012 | Hwang et al. | |
| 9,679,715 B2 * | 6/2017 | Mori | B60K 37/06 |
| 2010/0096891 A1 * | 4/2010 | Keegan | A47D 1/008 297/130 |
| 2014/0167463 A1 | 6/2014 | Sakata et al. | |
| 2015/0366350 A1 | 12/2015 | Di Censo et al. | |
| 2018/0029502 A1 * | 2/2018 | Georgiev | B60N 2/0228 |
| 2018/0244175 A1 * | 8/2018 | Tan | B60N 2/0248 |

FOREIGN PATENT DOCUMENTS

CN          207051337 U  *  2/2018

* cited by examiner

*Primary Examiner* — David E Allred
(74) *Attorney, Agent, or Firm* — Mintz Levin Cohn Ferris Glovsky and Popeo, P.C.; Peter F. Corless

(57) ABSTRACT

A method of adjusting a vehicle seat support system is provided. In particular, the method includes receiving a user selection at an input device and detecting a mode type associated with the user selection. A plurality of seat support features disposed within a vehicle seat are then adjusted toward a support characteristic that corresponds to the detected mode type.

14 Claims, 13 Drawing Sheets

Touring Mode Characteristic

Sport Mode Characteristic

Back Health Mode Characteristic

FIG. 4

| Support Modes | Characteristic description |
|---|---|
| Touring MODE | Flatter cushion support for long term driving |
| Back Health MODE | Increased back support/ curvature to ease back strain |
| Sport MODE | Higher lateral support for more aggressive driving |
| Comfort MODE | Moderate lateral contact to accommodate many body type |
| Relaxed MODE | Increases support in the lower and upper back and decreases support in mid back to cradle spine. |
| Other MODE | Modes simply require a description of feeling/support characteristic |

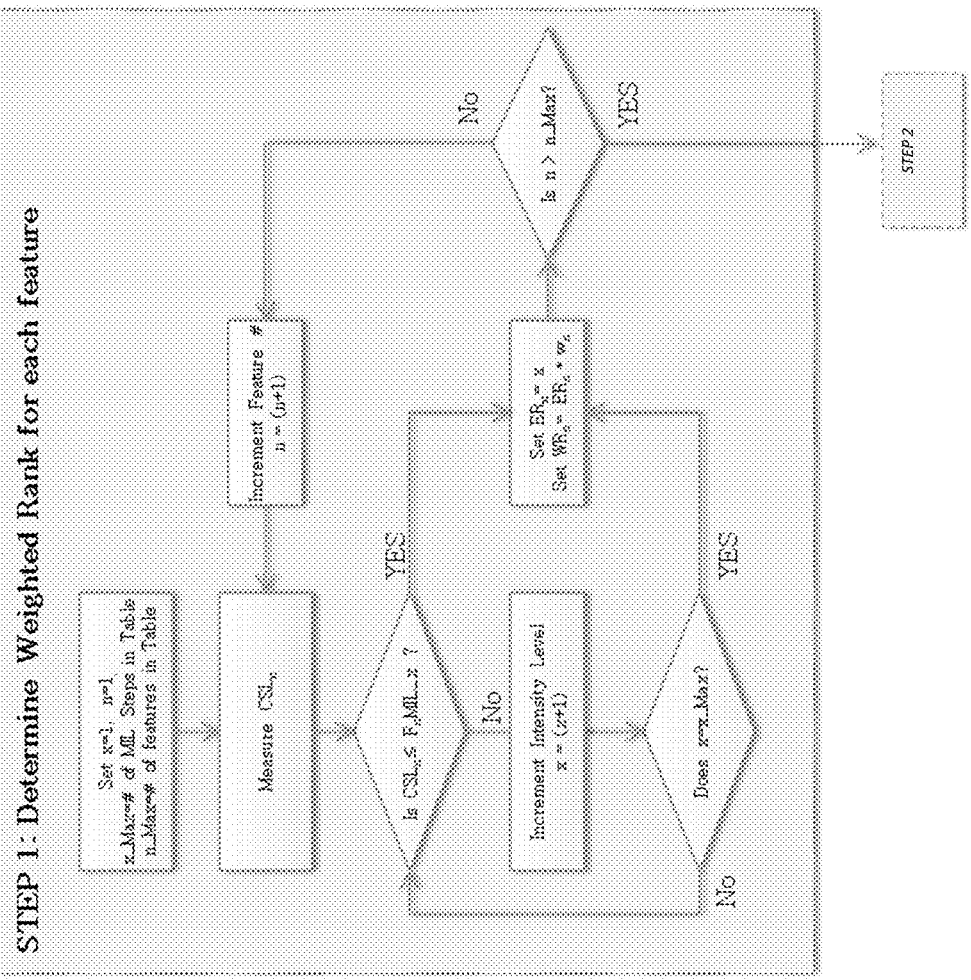

FIG. 7

| Last System State | User Activation scenario | Effective State | Calculated Initial Target | System output / User Deactivation | | | |
|---|---|---|---|---|---|---|---|
| Back Health 0 | 1st — User presses Sport Mode Button | Sport 0 | ← Sport 1 | Sport 1 | Sport 2 | Sport 5 | User releases Sport Mode Button |
| Sport 3 | 2nd — User presses Sport Mode Button again | Sport 3 | ← Sport 3 | Sport 3 | Sport 4 | Sport 5 | User releases Sport Mode Button |
| Sport 5 | 3rd — User presses Touring Mode Button | Touring 2 | ← Touring 2 | Touring 2 | Touring 3 | | User releases Touring Mode Button |
| Touring 3 | 4th — User presses OFF Button | Touring 3 | → Touring 2 | Touring 2 | Touring 1 | Touring 0 | User releases OFF Button |

| Feature | | Order | Weight | Mode Intensity level steps | | | | | |
|---|---|---|---|---|---|---|---|---|---|
| | | | | 0 | 1 | 2 | 3 | 4 | 5 |
| A | Upper Back | 1 | 9 | 3% | 40% | 64% | 79% | 92% | 100% |
| B | Shoulder Bolsters | 2 | 9 | 3% | 38% | 60% | 76% | 90% | 100% |
| C | Between Shoulders | 3 | 1 | 3% | 3% | 3% | 3% | 3% | 3% |
| D | Back Bolster | 4 | 9 | 3% | 25% | 47% | 61% | 87% | 100% |
| E | Lumbar Top | 5 | 1 | 3% | 3% | 3% | 4% | 5% | 6% |
| F | Lumbar Mid | 6 | 1 | 3% | 3% | 3% | 4% | 5% | 6% |
| G | Lumbar Bottom | 7 | 1 | 3% | 3% | 3% | 4% | 5% | 6% |
| H | Buttock | 8 | 1 | 3% | 3% | 3% | 4% | 7% | 9% |
| I | Buttock Bolster | 9 | 3 | 3% | 11% | 14% | 20% | 35% | 43% |
| J | Thigh Bolster | 10 | 9 | 3% | 33% | 44% | 54% | 79% | 91% |
| K | Thigh | 11 | 3 | 3% | 20% | 27% | 36% | 58% | 69% |

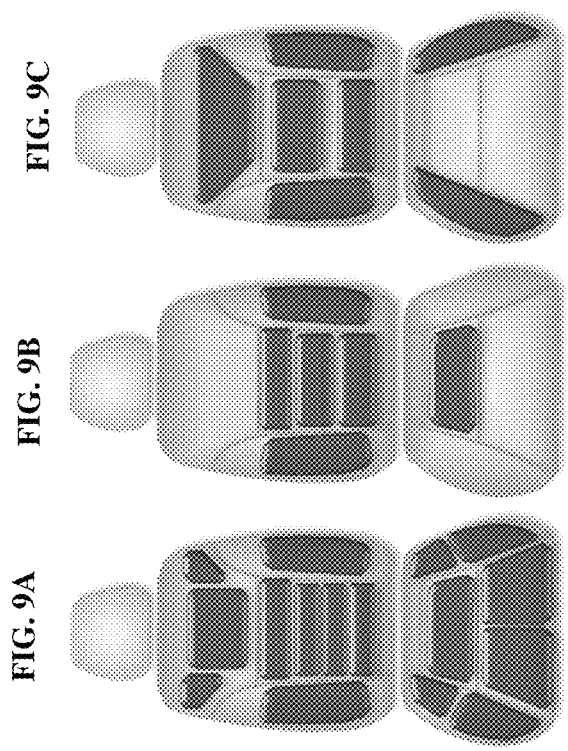

SMART MULTI-CONTOURED SEAT SUPPORT SYSTEM

BACKGROUND

1. Field of the Disclosure

The present disclosure relates to a smart multi-contoured seat support system, and more particularly, to a system and method that adjust multiple seat support features based on a selected seat support profile.

2. Description of Related Art

In general, vehicles today are equipped with adjustable seats to allow a driver or passenger to customize the seat for support and comfort levels as well as a height and distance from a steering wheel. Typically, the vehicle seats are adjusted by controlling a pneumatic or mechanical adjustment system, for example, adjusting air or fluid pressure, within cushion bladders of the seat. Each vehicle seat may include a plurality of features that are adjustable to support different areas of the body.

However, in currently developed seat systems, each feature within the seat must be adjusted independently thus making it more cumbersome to achieve a desired support of the seat. The required independent control also causes an increase in distraction to the driver when a driver attempts to adjust the seat while operating the vehicle. Additionally, although vehicles are being developed with upwards of 30 feature adjustments, the systems have become more complex than convenient due to the need to independently control the features. It is therefore desirable to provide a multi-contoured seat support system which assures proper seating control with minimal burden on the user.

The above information disclosed in this section is merely for enhancement of understanding of the background of the disclosure and therefore it may contain information that does not form the prior art that is already known in this country to a person of ordinary skill in the art.

SUMMARY

The present disclosure provides a smart multi-contoured seat support system that adjusts multiple seat support features based on a user selected seat support profile.

According to one aspect of the present disclosure, a method of adjusting a vehicle seat support system may include receiving a user selection at an input device and detecting a mode type associated with the user selection. The seat support features within a vehicle seat may then be adjusted toward a support characteristic that corresponds to the detected mode type.

In addition, the method may include setting a target intensity as the support characteristic based on the detected mode type. The seat support features may be adjusted until a maximum target intensity is reached or until an engagement of the input device is released. A sensor or a plurality of sensors may be configured to detect pressure or force exerted on the vehicle seat regions and based on sensor feedback, a controller may be configured to determine which of the seat support features to adjust.

Further, the method may include storing a last selected mode type in response to the release of the input device engagement and then the system may be restarted based on a last intensity level. A plurality of mode types may be stored in a database in which an activation order of each seat support feature is defined. The database may further define weighted rank factors used to calculate an effective system state, a number of intervals to reach a maximum intensity level, and target support levels for each seat support feature at each intensity interval. The seat support features may also be adjusted either pneumatically or mechanically and the mode type may be an adjustment mode such as a sport mode, a touring mode, and a back health mode or an off mode.

According to another aspect of the present disclosure, a vehicle seat support system is provided. In particular, the system may include a vehicle seat having a plurality of seat support features and an input device disposed in a vicinity of the vehicle seat. Additionally, a controller may be configured to adjust a support level (e.g., an intensity level) of each seat support feature based on a user mode selection at the input device.

Additionally, the controller may be configured to adjust the seat support features based on a support profile table stored in a memory of the controller. The support profile table may include an intensity level of each seat support feature for each mode of a plurality of modes. The system may also include a user interface configured to display the plurality of modes from which a user selects a desired mode. The controller may also be configured to determine an initial target state of the system (e.g., effective system state) with respect to the user mode selection.

According to yet another aspect of the present disclosure, a method of adjusting a vehicle seat support system is provided. In particular, the method may include receiving a user selection at an input device and detecting a mode type that corresponds to the user selection. A weighted rank may be calculated for each of a plurality of seat support features within a vehicle seat by comparing a current intensity level of each seat support feature and the detected mode type. Further, an effective system state may be calculated based on the detected mode type and the weighted rank of each seat support feature. A target intensity level may also be set based on the user selection. The intensity level of each seat support feature may then be adjusted to meet the target intensity level of each seat support feature.

Additionally, the method may include increasing the target intensity level by one level when the user selection is an adjustment mode, for example, a sport mode, a touring mode, or a back health mode, and decreasing the target intensity level by one level when the user selection is an off mode. The intensity of each seat support feature may be adjusted until an engagement of the input device is released or until the maximum target intensity level is reached. A support profile may also be generated for a plurality of mode types to provide an intensity level for each seat support feature corresponding to each mode type. Further, the method may include storing a last selected mode in response to the release of the input device engagement and restarting the vehicle seat support system based on a last intensity level.

Notably, the present disclosure is not limited to the combination of the seat system elements as listed above and may be assembled in any combination of the elements as described herein.

Other aspects of the disclosure are disclosed infra.

BRIEF DESCRIPTION OF THE DRAWINGS

The above and other objects, features, and advantages of the present disclosure will be more apparent from the following detailed description taken in conjunction with the accompanying drawings, in which:

FIG. 4 illustrates a chart of various support modes and the corresponding characteristic description according to an exemplary embodiment of the present disclosure;

FIG. 6A illustrates a flowchart of determining a weighted rank for each seat support feature according to an exemplary embodiment of the present disclosure;

FIG. 7 illustrates a chart of a target intensity according to an exemplary embodiment of the present disclosure;

FIGS. 9A-9C illustrate seat systems with different number of adjustable features according to an exemplary embodiment of the present disclosure;

Throughout the accompanying drawings, the same reference numerals will be used to denote the same components.

Figure 1:
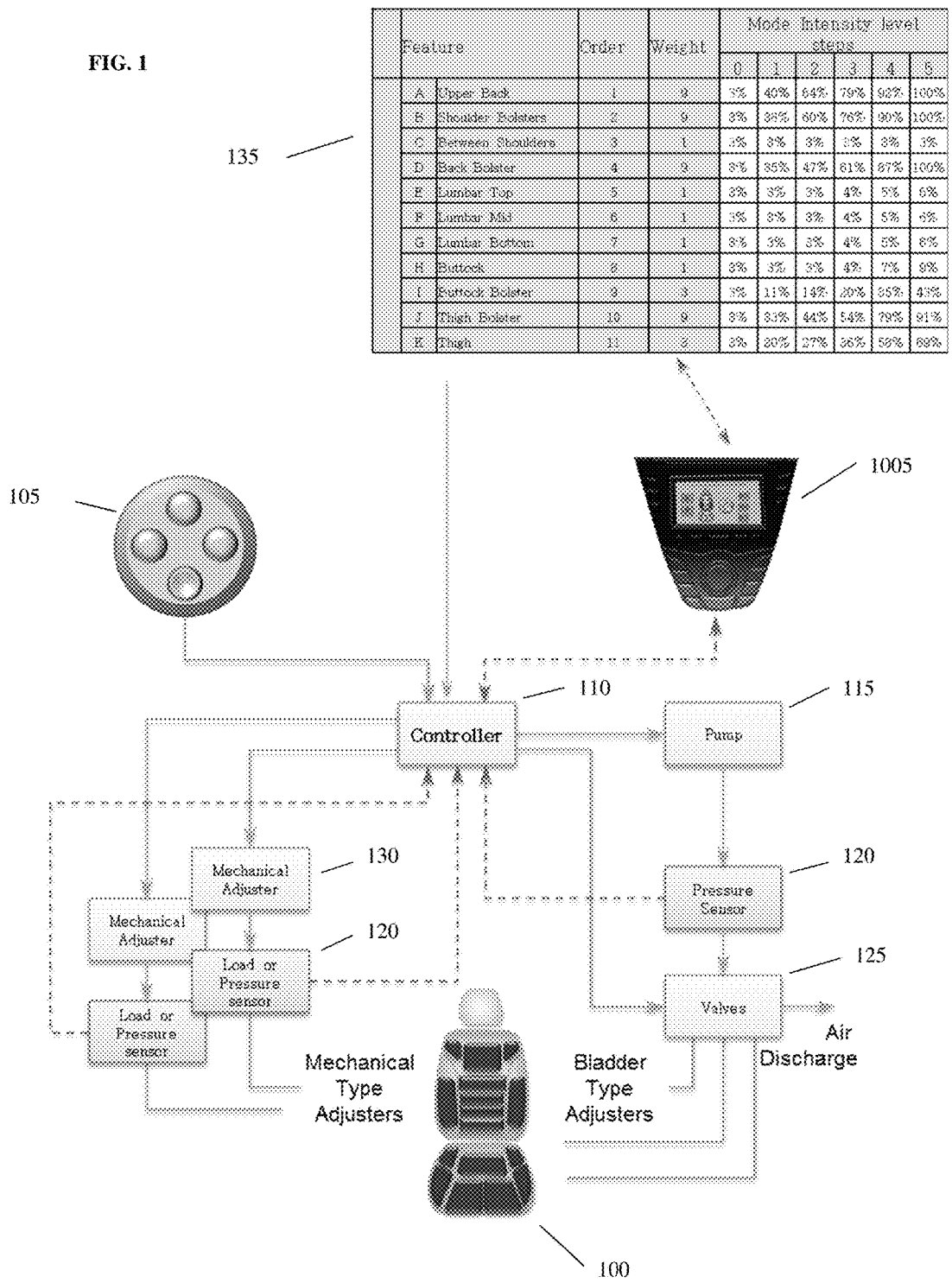
FIG. 1 illustrates a system overview of the multi-contoured seat support system according to two exemplary embodiments of the present disclosure.

| Listing of reference numerals | |
|---|---|
| vehicle seat | 100 |
| input device | 150 |
| controller | 110 |
| pump | 115 |
| pressure sensor | 120 |
| valves | 125 |
| mechanical adjusters | 130 |
| support profile | 135 |
| buttons | 205, 210, 215, 220 |
| user interface | 1005 |

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure provides a vehicle seat support system that is capable of adjusting multiple seat support features simultaneously based on a support profile and a detected mode type received at a user input device. In particular, the vehicle seat support system allows a user to select a mode type at an input device which triggers a controller to adjust the seat support features that correspond to the selected mode type. That is, once the controller detects the user input, each seat support feature is checked for adjustment. The controller gradually adjusts the seat support features at intervals until either a maximum target profile is reached or until the user releases the engagement with the input device. The system is also capable of storing a last known seat support feature setting such that when the system is restarted, the vehicle seat is not required to be reset to an original position.

According to an aspect of the present disclosure and as shown in FIG. 1, the vehicle seat support system may include a vehicle seat 100, an input device 105, and a controller 110. In particular, the vehicle seat 100 includes a plurality of seat support features (shown as the darker shaded regions in FIG. 1) and the input device 105 may be disposed in a vicinity of the vehicle seat 100. For example, the input device 105 may be disposed at a lower side of the vehicle 100 (see FIG. 2). However, the present disclosure is not limited to such a disposition of the input device and the input device may be disposed anywhere within reach of a user. The controller may be configured to communicate with a support profile 135, a control display 1005, the input device 105, mechanical adjusters 130, load or pressure sensors 120, a pump 115, and plurality of valves 125 via a controller area network (CAN). Further, the controller 110 may be configured to adjust a support or intensity level of each seat support feature based on a user mode selection at the input device. The adjustment of the support level may be executed simultaneously such that each seat support feature is adjusted at the same time until a target intensity level is reached at each feature.

The adjustment of the seat support features may be a pneumatic adjustment, a mechanical adjustment (e.g., by mechanical adjusters 130), or a combination of the pneumatic adjustment and the mechanical adjustment. For example, the vehicle seat 100 may include a plurality of bladders having a pump 115 (e.g., pneumatic pump), a pressure sensor 120 (e.g., a load or pressure sensor), and multiple valves 125. For example, air may be supplied to the bladders mounted inside each vehicle seat. That is, the bladders are expanded or shrunk based on the inflow and outflow of air. The controller may be configured to operate the valves to adjust the air flow into the bladders. Particularly, the controller may be configured to adjust the air flow between an air storage tank and the bladders. The adjustment system may be activated or deactivated based on sensor feedback. Additionally, the bladders may be adjusted based on a posture and weight as detected by a load or pressure sensor 120. Alternatively, the adjustment may be controlled mechanically using the mechanical type adjusters 130. Such a technique is well known to those of ordinary skill in the art and thus, a detailed description thereof will be omitted.

Figure 2:
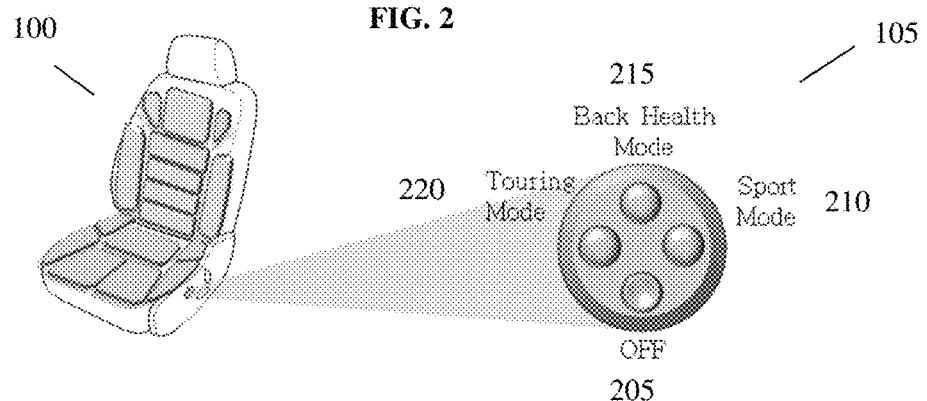
FIG. 2 illustrates a vehicle seat with an input device for selecting a seat mode according to an exemplary embodiment of the present disclosure.
Figure 3A:
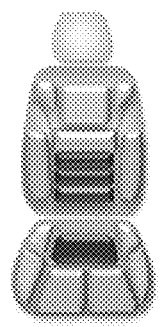
FIGS. 3A-3C illustrate various support characteristics of a plurality of mode types of the system according to an exemplary embodiment of the present disclosure.
Figure 3B:
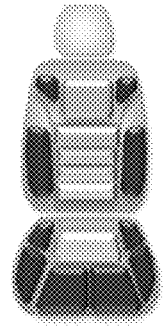
Figure 3C:
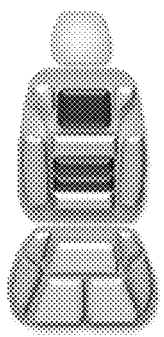

Furthermore, as shown in FIG. 2, the input device 105 may include a plurality of inputs which may be button types or touch types configured to receive a user selection. The various buttons of the input device may correspond to a plurality of adjustment modes and an off state or mode. For example, the input device may include at least three buttons (210, 215, 220) corresponding to at least two unique support modes such as a back health mode, a sport mode, and a touring mode as well as one button (205) corresponding to an off mode. The controller 110 may be configured to detect a mode type based on a received signal when a button on the input device is depressed or engaged by a user. The different modes each correspond to a different support characteristic as shown in FIGS. 3A-3C. That is, FIGS. 3A-3C illustrate the seat support features which may be activated based on the selected mode (activated features shown in a darker shade in the drawings). For example, FIG. 3B shows various seat support features located at a passenger's back side to thus support a back health mode.

The table shown in FIG. 4 provides a description of the support characteristic for a plurality of different mode types. In particular, the touring mode provides a flatter cushion support for driver over a longer period of time (e.g., long term driving), the back health mode provides an increased back support or curvature to ease back strain, and a sport mode provides higher lateral support for more aggressive driving. The present disclosure is, however, not limited to these three listed mode types and the input device may include more buttons to support various other mode types. For example, FIG. 4 shows that a comfort mode provides a moderate lateral support to accommodate many different body types and a relaxed mode provides an increased support in the lower and upper back area and decreases support in a mid-back area to cradle the spine of the passenger. Other support modes may be provided which may be customized by a vehicle manufacturer or a user. For example, a user may be able to pre-store modes with various support characteristics for a personalized driving support.

Figure 5:
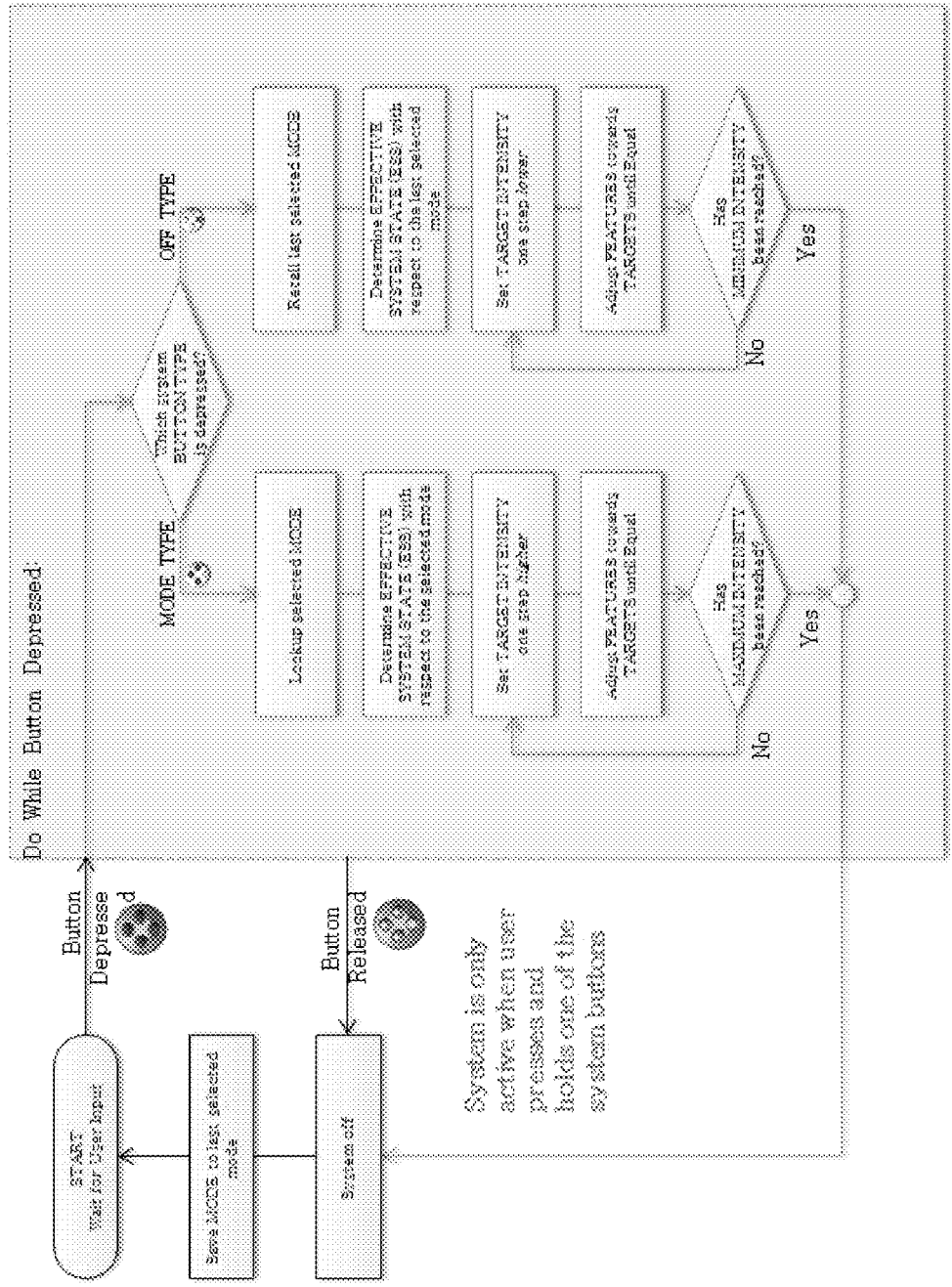
FIG. 5 illustrates a flowchart of the method for adjusting the multi-contoured seat support system according to an exemplary embodiment of the present disclosure.

Reference will now be made to FIG. 5 which provides a flowchart of a method for adjusting the multi-contoured seat support system according to an exemplary embodiment of the present disclosure. The system may remain idle until the controller 110 receives a user selection at the input device 105, that is, until a button of the input device is engaged. In response to receiving the user selection, the controller 110 may be configured to detect a mode type that is associated with the user selection. Once the mode type is detected as an adjustment mode (and not an off mode), the controller 110 may be configured to adjust seat support features within the vehicle seat 100 toward a support characteristic that corresponds to the detected mode type.

A target intensity may be further set as the support characteristic based on the detected mode type. That is, each feature of the vehicle seat may be set with a different intensity (e.g., a varied amount of air within each seat bladder) based on the selected mode. The seat support features may then be adjusted until the target intensity is reached or an engagement of the input device is released (e.g., the user releases the input device button). The features may be adjusted specifically based on an activation order as defined in a stored database 135 of a plurality of mode types. The database may further include weighting rank factors used to calculate an effective system state (to be discussed further hereinbelow), a number of intervals to reach a maximum intensity level, and target support levels for each seat support feature at each intensity interval.

Once the target intensity level is reached or the engagement of the input device is released, the controller may be configured to store a last intensity level. In particular, when the user selection is an off mode instead of an adjustment mode, the controller may be configured to recall the last selected mode. Accordingly, when the vehicle seat support system is restarted after an off mode has been selected, the controller may be configured to start the system with the last intensity level in the last selected mode. Thus, the system prevents the need for a return to an original state which would delay the adjustment upon restart of the system.

According to another exemplary embodiment of the present disclosure, the method of adjusting a vehicle seat support system may include receiving a user selection at an input device and detecting a mode type that corresponds to the user selection. Further, a weighted rank of each seat support feature within a vehicle seat may be calculated by comparing a current intensity level of each feature within the detected mode type (step 1).

In particular, FIG. 6A illustrates a flowchart for the determination of a weight rank for each feature of a vehicle seat. First, a table is generated for each mode and accessed by the controller which provides mode intensity level steps as shown in Table 1 below. Table 1 is merely an example of one mode type and a separate table is generated for each mode type. In particular, n_max is set to be the number of features provided in the table for the detected mode type and x_max is set as the number of mode intensity level (MIL) steps provided in the table for the detected mode type. In other words, Table 1 varies based on the different mode types. The controller may then be configured to measure a current support level (CSL) for each number of features ($CSL_n$) and then compare the measured CSL with a MIL of the particular feature. For example, each feature is numbered in the below table based on an activation order. In particular, the controller may be configured to determine whether $CSL_nF_n$MIL_x as a first condition. When the first condition is not satisfied, the controller may be configured to increase the intensity level by one (x=(x+1)) and then determine whether x=x_max which indicates whether the maximum intensity level has been reached. If the maximum intensity level has not been reached, the process may return to checking whether the first condition is satisfied.

Further, when the first condition is satisfied or when x=x_max, the controller may be configured to set an effective rank (ER) and a weighted rank (WR) as provided below.

$$ER_n = x \text{ and } WR_n = ER_n * w_n$$

wherein w is the weight of each seat support feature.

EXAMPLE 1

Shown below is an example of determining a weighted rank for each feature using a pre-stored support profile generated for each mode with an activation order of each seat support feature. The pre-stored support profile is specifically accessed by the controller to determine the weighted rank.

TABLE 2

| Feature | F # | | Weight | Intensity level | | | | | |
|---|---|---|---|---|---|---|---|---|---|
| | | (Order) | | 0 | 1 | 2 | 3 | 4 | 5 |
| Upper Back | A | 1 | 9 | 0% | 40% | 64% | 79% | 92% | 100% |
| Shoulder Bolsters | B | 2 | 9 | 0% | 38% | 60% | 76% | 90% | 100% |
| Between Shoulders | C | 3 | 1 | 0% | 0% | 0% | 1% | 2% | 3% |
| Back Bolster | D | 4 | 9 | 0% | 35% | 47% | 61% | 87% | 100% |
| Lumbar Top | E | 5 | 1 | 0% | 2% | 3% | 4% | 5% | 6% |
| Lumbar Mid | F | 6 | 1 | 0% | 2% | 3% | 4% | 5% | 6% |
| Lumbar Bottom | G | 7 | 1 | 0% | 2% | 3% | 4% | 5% | 6% |
| Buttock | H | 8 | 1 | 0% | 2% | 3% | 4% | 7% | 9% |
| Buttock Bolster | I | 9 | 3 | 0% | 11% | 14% | 20% | 35% | 43% |
| Thigh Bolster | J | 10 | 9 | 0% | 33% | 44% | 54% | 79% | 91% |
| Thigh | K | 11 | 3 | 0% | 20% | 27% | 36% | 58% | 69% |

| Current Support | Effective Rank | Weighted Rank |
|---|---|---|
| 60% | 2 | 18.00 |
| 20% | 1 | 9.00 |
| 41% | 5 | 5.00 |
| 20% | 1 | 9.00 |
| 55% | 5 | 5.00 |
| 64% | 5 | 5.00 |
| 41% | 5 | 5.00 |
| 62% | 5 | 5.00 |
| 12% | 2 | 6.00 |
| 23% | 1 | 9.00 |
| 41% | 4 | 12.00 |

Once the ER and WR have been set, the controller may be configured to determine whether n>n_Max as a second condition. That is, the controller may be configured to check whether the feature is the last in the table for the particular mode type. If the second condition is not satisfied, the feature number may be increased by one (n=(n+1)) and then the CSL may be measured again. However, when the second condition is satisfied, the process may proceed as to be described herein below.

TABLE 1

| | Feature # | | | Mode Intensity Level (MIL) steps | | | |
|---|---|---|---|---|---|---|---|
| | Feature | (Order) | Weight | 0 | 1 | ... | x |
| $F_1$ | Feature 1 | 1 | $w_1$ | $F_1MIL_o$ | $F_1MIL_2$ | ... | $F_1MIL_x$ |
| $F_2$ | Feature 2 | 2 | $w_2$ | $F_2MIL_o$ | $F_1MIL_2$ | ... | $F_2MIL_x$ |
| ... | ... | ... | ... | ... | ... | ... | ... |
| $F_3$ | Feature n | n | $w_n$ | $F_nMIL_o$ | $F_nMIL_2$ | ... | $F_nMIL_x$ |

| Current Support | Effective Rank | Weighted Rank |
|---|---|---|
| $CSL_1$ | $ER_1$ | $WR_1$ |
| $CSL_2$ | $ER_2$ | $WR_2$ |
| ... | ... | ... |
| $CSL_n$ | $ER_n$ | $WR_n$ |

First, a lowest intensity level greater than a current state is determined as shown below using information from the above tables.

Upper Back$_{CSL}$=60%

Upper Back$_{IL1}$=40%

Upper Back$_{IL2}$=64%

Upper Back$_{wt}$=9

Upper Back$_{CSL}$<Upper Back$_{IL1}$ 60<40 FALSE

Upper Back$_{CSL}$<Upper Back$_{IL2}$ 60<64 TRUE

Next, the effective rank is determined using the intensity level (IL) that is true from above.

Upper Back$_{ER}$=2

Lastly, the weighted rank is calculated by multiplying the effective rank with the feature weighting as shown below.

Upper Back$_{WR}$=Upper Back$_{ER}$*Upper Back wt 2*9=18

Figure 6B:
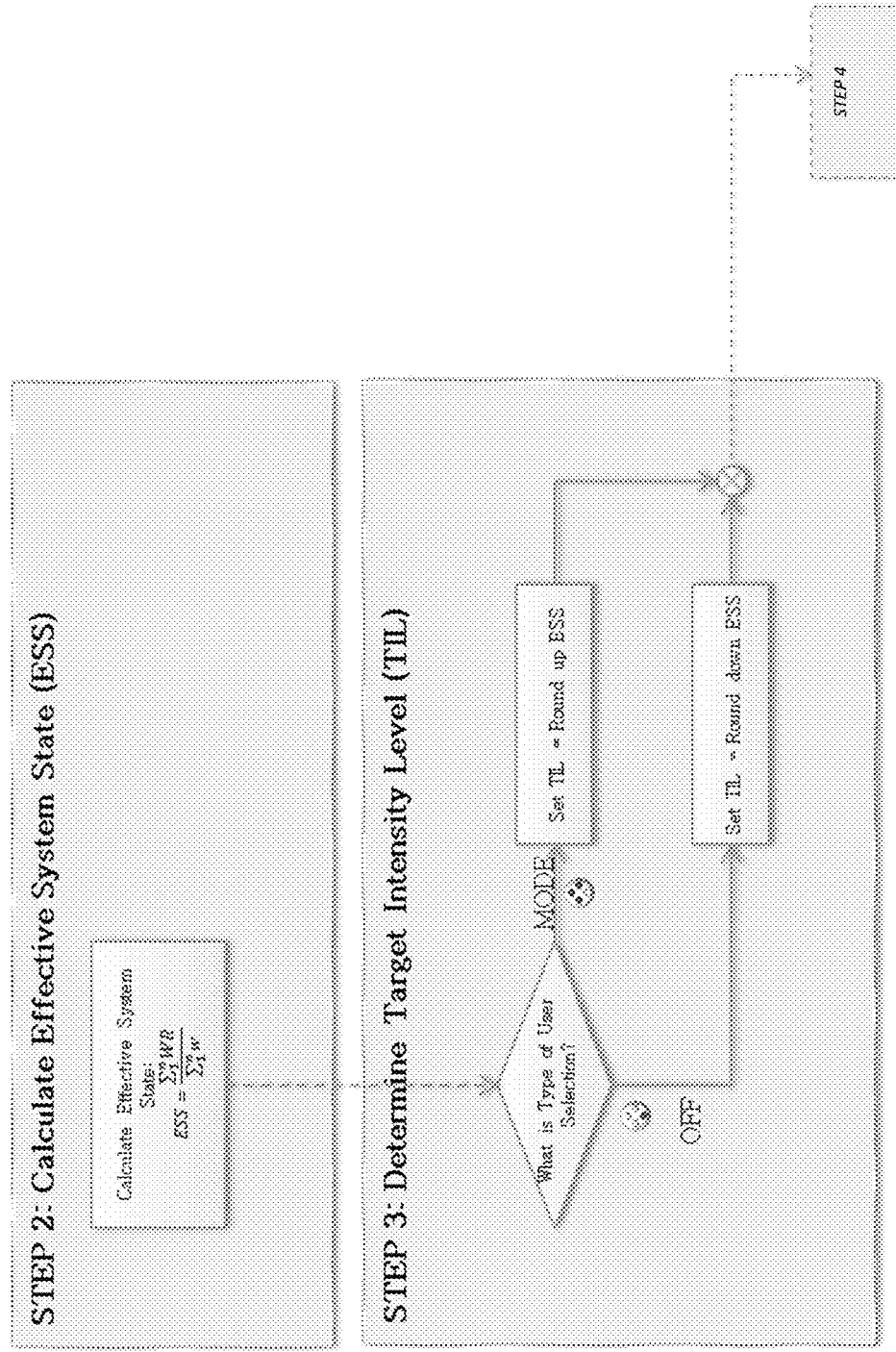
FIG. 6B illustrates a flowchart of calculating an effective system state and determining a target intensity level according to an exemplary embodiment of the present disclosure.

Then, as shown in FIG. 6B, when the second condition is satisfied, the controller may be configured to calculate an effective system state (ESS) based on the detected mode type and the weighted rank of each feature (step 2). In other words, the determination of the effective system state allows the system to change modes from a current state without having to reset the intensity of each seat support feature to zero. For example, the ESS allows an initial target state of the system to be determined with respect to the user selected mode. The weighted rank (e.g., weighting value) may then be used to modify the influence of each seat support feature on the effective system state. In particular, the ESS may be calculated using the following equation:

$$ESS = \frac{\sum_1^n WR}{\sum_1^n w}$$

wherein WR is the weighted rank, w is the weight, n is the feature number, and ESS is the effective system state.

EXAMPLE 2

Shown below is an example of calculating the ESS using the tables provided above (Table 2). Notably, the data shown in FIG. 2 is merely exemplary to provide one of ordinary skill in the art sufficient understanding of the disclosure; however, the disclosure is not limited thereto. First, a sum of the weights and a sum of the weighted ranks are calculated.

$$\Sigma_1^n w = 47 \quad \Sigma_1^n WR = 88$$

Then, the determined sums may be applied to the equation below:

$$ESS = \frac{\sum_1^n WR}{\sum_1^n w} = 88/47 = 1.87$$

Once the ESS has been calculated, the controller may be configured to recognize the type of user selection that has been received at the input device as shown in FIG. 6B. That is, the controller may be configured to detect either an adjustment mode or an off mode to thus determine a target intensity level (TIL) (step 3). The target intensity level indicates the maximum level that each seat support feature should reach to correspond to a particular support mode. For example, the target intensity level may correspond to the amount of air that is injected or discharged from the various bladders within the vehicle seat to reach a support characteristic. When an adjustment mode (e.g., a sport mode, a touring mode, a back health mode, or the like) is input by the user, the controller may be configured to round up the ESS by 1 to set the TIL. However, when the off mode is input by the user, the controller may be configured to round down the ESS by 1 to set the TIL using the last selected mode.

Figure 6C:
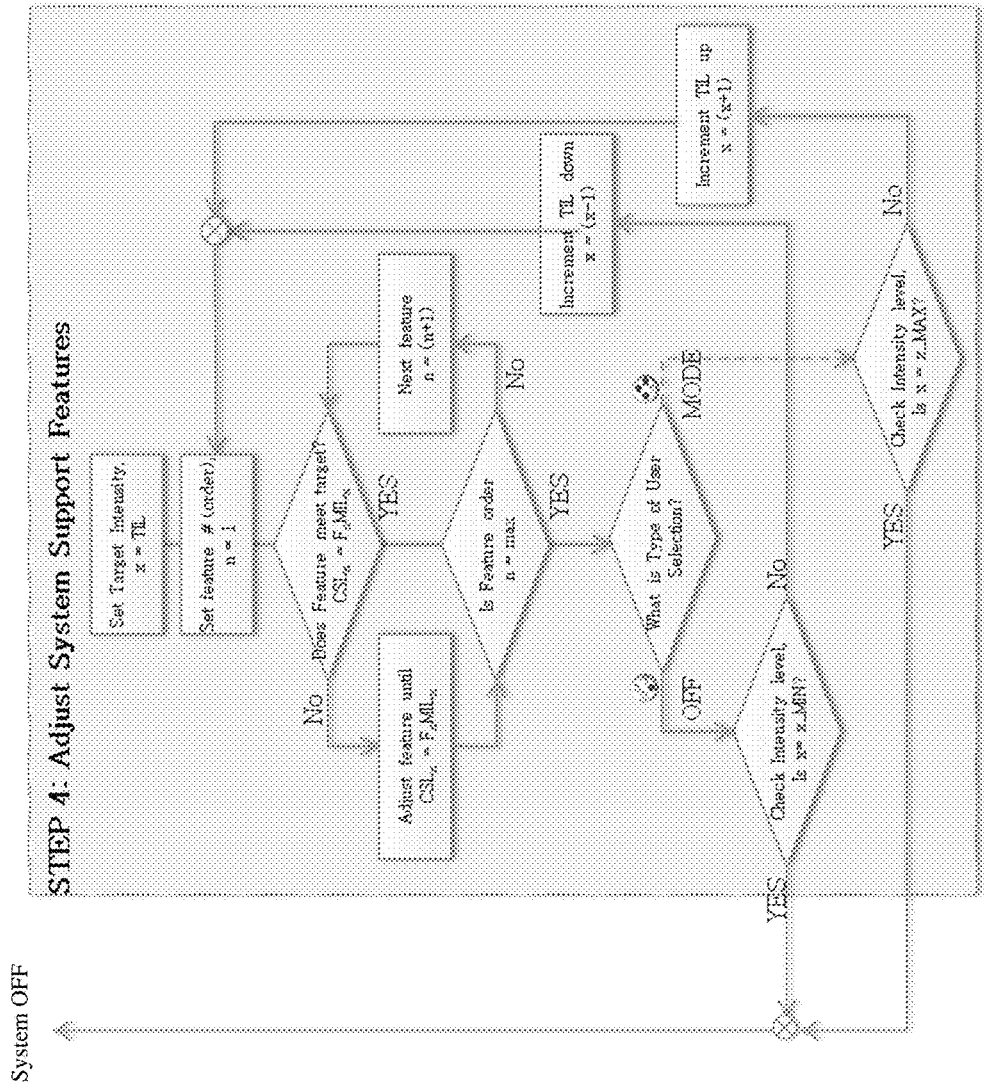
FIG. 6C illustrates a detailed flowchart for adjusting the seat support features according to an exemplary embodiment of the present disclosure.

Next, when the TIL has been set by the controller, the controller may be configured to adjust the intensity level of each seat support feature to reach the target intensity level as shown in FIG. 6C (step 4). Based on the pre-stored support profile, each of the seat support features are numbered (e.g., ordered) based on an activation order. Thus, the process begins with setting the feature number order as n=1. The controller may be configured to again determine whether the first condition is satisfied as discussed above, $CSL_n \leq F_n\text{-}MIL\_x$. When the first condition is not satisfied, the feature may be adjusted until the condition is satisfied. However, when the first condition is satisfied, the controller may be configured to check whether the feature order is at a maximum (n=max). When the feature order is not at a maximum, the process moves to the next feature (n=(n+1)) and then rechecks the first condition again.

However, when the feature order is at a maximum (e.g., each of the seat support features of the particular mode has been numbered), the controller may be configured to detect a mode type based on the user selection. When the user selection is an off mode, the controller may be configured to check and store the intensity level. For example, if x=x_min (wherein x is a number of a mode intensity level step), then the process may end and the system may be turned off or placed in an idle mode. When x is not equal to x_min, the controller may be configured to decrease the TIL by 1 (x=(x−1)) and then return to setting the feature number order.

Further, when the user selection is an adjustment mode (e.g., a sport mode, a touring mode, a back health mode, or the like), the controller may be configured to check the intensity level to determine whether x=x_max. In other words, the controller may be configured to determine whether the intensity level has reached a maximum intensity level for the particular mode type selected. When the maximum intensity level has been reached, the controller may be configured to turn off the system or place the system in an idle mode. When the maximum intensity level has not been reached, the controller may be configured to increase the target intensity level by one (x=(x+1)) and then the process may return to setting the feature number order.

In summary, the controller may be configured to cycle through each seat support feature based on a selected mode and an activation order in the support profile and determine whether a maximum target intensity level has been reached before the system becomes idle again (e.g., waits for user input). Alternatively, if the engagement of the input device is released by the user, the controller may be configured to stop the cycle through the seat support features and fix the intensity level. For example, a user may release the input device when a desired intensity level other than the maximum intensity level is reached. FIG. 7 illustrates an exemplary chart showing the adjustment of the seat support feature and user deactivation (e.g., release of input device button).

For example, as shown in FIG. 7, when the last system state is a back health mode with an intensity level of 0 and the user presses the sport mode button on the input device, the controller may be configured to determine the effective system state of the user selected mode as sport intensity level 0 using the calculations discussed previously. Further, the controller may be configured to calculate the target intensity level as sport intensity level 1 and then begin adjusting the seat support features. In this scenario, the user releases the sport mode about half way through the adjustment toward the third intensity level of the sport mode (e.g., not the maximum intensity within the particular level, about 50%) which then becomes the last system state. Thus, when the user engages the input device and again presses the sport mode button, the system restarts with the sport intensity level 3 at about 50% as the effective system state. Then, the controller may be configured to calculate the target intensity to be a maximum level of the intensity level 3 (e.g., intensity level 3 100%). However, since the intensity level 3 is not a maximum intensity interval of a sport mode and the user continuously engages the input device button, the controller continues to adjust the seat support features (e.g., adjusts to the next intensity interval or step). In this scenario, the user releases the engagement at about 90% of the sport mode intensity level 5, which thus becomes the last system state.

Further, when the user presses the touring mode button of the input device, the controller may be configured to calculate the effective system state. Since the user has now engaged a mode other than the sport mode which was the last system state, the effective system state will be determined as the last saved intensity level within the touring mode, as shown in FIG. 7. Then, the controller may be configured to calculate the target level as a maximum of the touring intensity level 2. In this example, the user releases the touring mode button at about 40% of the touring intensity level 3 which then becomes the last system state. Lastly, when the user engages the off mode button of the input device, the calculated target intensity becomes a decreased level rather than an increased level. Particularly, the controller may be configured to decrease the intensity levels until an intensity level 0 is reached or the user releases the off button. The system may then return to an idle state until the user again engages the input device.

Figures 8A, 8B:
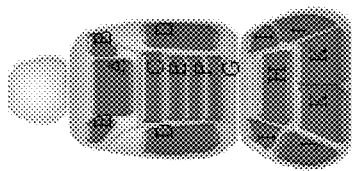
FIGS. 8A-8C illustrate a mode support profile for a 22-way support system according to an exemplary embodiment of the present disclosure.
Figure 8C:
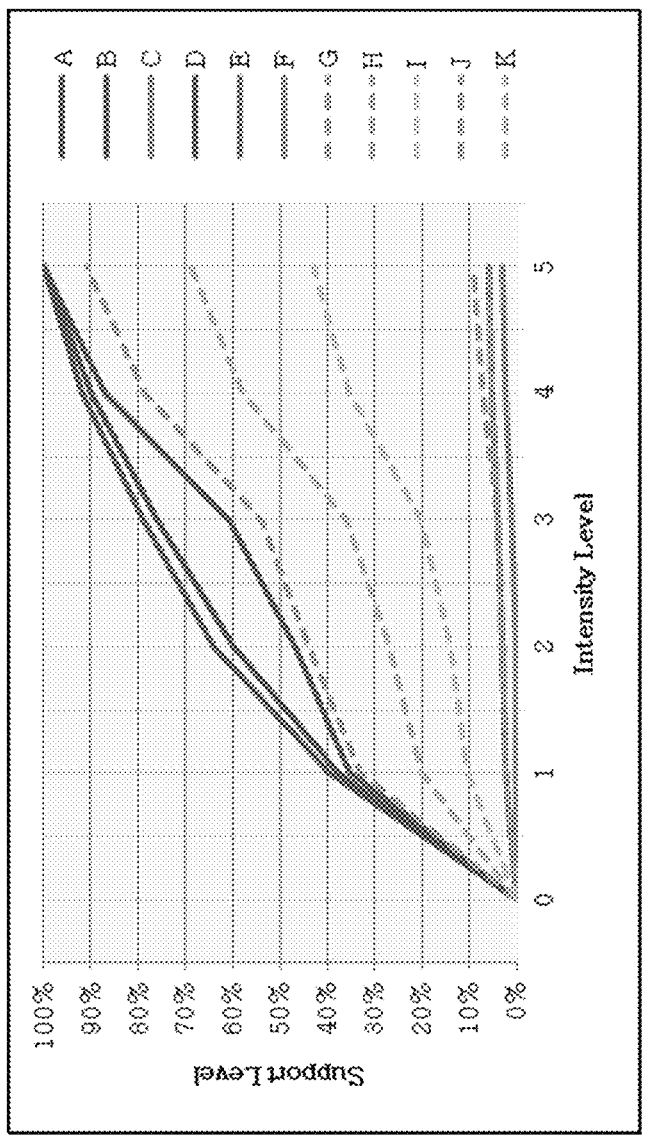

Reference will now be made to FIGS. 8A-8C in which a mode support profile is described for a 22-way support system according to an exemplary embodiment of the present disclosure. FIG. 8A illustrates an exemplary 30-way adjustable vehicle seat which includes a 22-way support surface (e.g., 11 seat support features) and 8-way power seat adjusters. The table in FIG. 8B illustrates the support profile table corresponding to the vehicle seat of FIG. 8A. In particular, the table shows the activation order of the 11 seat support features and 5 mode intensity levels. That is, the table defines an activation order of each seat support feature, a weight rank factor used to calculate the effective system state as described above, the number of intervals or steps to reach a maximum intensity level, and target support levels for each seat support feature at each intensity level.

Particularly, the weighted factor rank may be adjusted for different seat systems to emphasize certain features over others. Additionally, the number of intervals or steps to reach the maximum intensity level is not limited to 5 and may be adjusted based on system needs such as cost, system timing, and feel difference to a driver. In the exemplary table shown in FIG. 8B, a system level tolerance is used to determine when the support level target is met and this example shows that the support levels for mode 0 are set to 3% to account for a tolerance. The table shown in FIG. 8B is merely exemplary and a different table may be stored in the controller for each mode supported by the system. Further, FIG. 8C illustrates a graph of the support level versus the intensity level for each seat support feature to provide a visual view of the adjustment of the seat support features.

However, the number of adjustable seat support features is not limited to the above-described example. For instance, as shown in FIGS. 9A-9C, the number of seat support features may be adjusted to, for example, control cost and mass. FIG. 9A illustrates a 30-way adjustable vehicle seat having a 22-way support surface (e.g., 11 seat support features) and 8-way power seat adjusters (as shown in FIG. 8A), FIG. 9B illustrates a 24-way adjustable vehicle seat having a 16-way support surface (e.g., 8 seat support features) and 8-way power seat adjusters, and FIG. 9C illustrates a 20-way adjustable vehicle seat having a 12-way support surface (e.g., 6 seat support features) and 8-way power seat adjusters.

Figure 10:
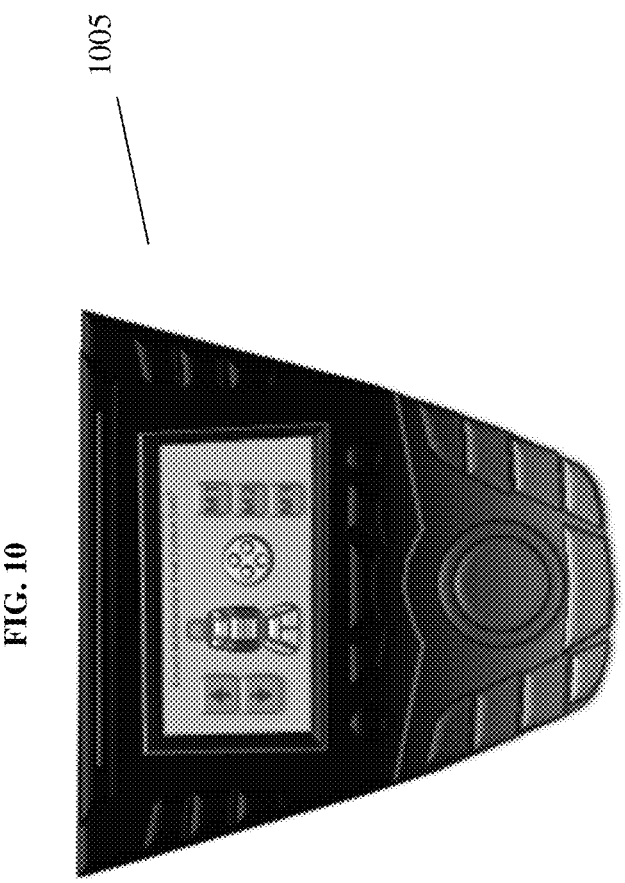
FIG. 10 illustrates a control display for the multi-contoured seat support system according to a second exemplary embodiment of the present disclosure.

According to a second exemplary embodiment of the present disclosure, the vehicle seat support system may further include user interface 1005 (e.g., a control display) as shown in FIG. 10. The use of the control display allows the system to be operated either by omitting the input device or using the input device in conjunction with the control display. For example, an image of the input device may be displayed on the user interface 1005 such that a user avoids having to reach down to an input device. Instead, the user may simply select the desired mode on the control display which may be a touchscreen. The user interface 1005 may also display features such as increase and decrease of intensity levels (shown by arrows on the display of FIG. 10). Additionally, the user interface 1005 may be configured to display an image of the vehicle seat and the seat support features adjustable for a selected mode type.

Figure 11C:
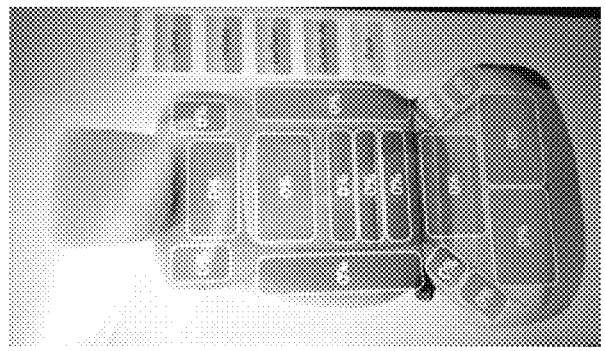
FIGS. 11A-11C illustrate displays of different mode types of the seat support system according to the second exemplary embodiment of the present disclosure.
Figure 11B:
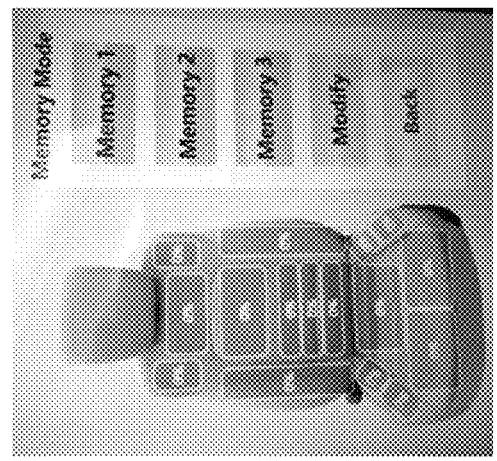
Figure 11A:
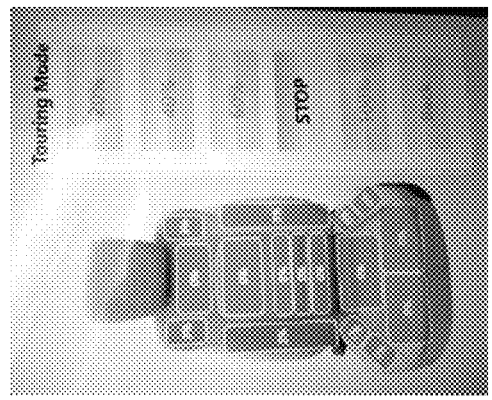

FIGS. 11A-11C illustrate displays of different mode types on the user interface 1005 of the seat support system according to an exemplary embodiment of the present disclosure. In particular, FIG. 11A illustrates a display of a touring mode, FIG. 11B illustrates a display of a memory mode, and FIG. 11C illustrates a display of customized intensity levels.

Referring to FIG. 11A, the user is provided with a display of the vehicle seat and intensity level percentages at each seat support feature. The user may then select on the touch screen of the user interface 1005 an intensity interval or step as a target intensity level. For example, a user may select within the touring mode 20%, 40%, 60%, and 100% which correspond to intensity levels. Additionally, the user may select a stop input which terminates the adjustment of the seat support feature and a back input which decreases the intensity level.

FIG. 11B illustrates a memory mode in which a user may pre-store custom modes with desired intensity levels. For example, once the custom modes are stored, the user may select the memory mode input and then select a mode (e.g., memory 1, memory 2, and memory 3) within the memory mode which will adjust the seat support features to the desired intensity level. The user may also modify each memory mode and FIG. 11C illustrates a display output for a user to modify the memory modes. For example, within the modify mode input, the user may inflate and deflate each seat support feature independently or simultaneously toward a desired intensity level, thus providing the user with a customized seat support system.

As discussed above, the smart multi-contoured seat support system and method thereof are capable of simultaneously adjusting multiple seat support features based on a user selected mode type. Accordingly, a user is not required to input different selections for different seat support features, thus reducing distractions while the user is, for example, driving the vehicle. Additionally, user convenience is greatly enhanced since the user has control over an intensity level within a selected mode, thus creating a customized support system. The smart system also prevents the need to return to an original support position (e.g., resetting the system to zero) by storing a last selected mode type. Thus, when the system is restarted, the system is capable of starting close to a last known position of the selected mode when a same mode is selected. Further, when the system is restarted, the above-described calculations are repeated from feature 1. However, as the system cycles through the features, if the features are already full or at a maximum, the system is capable of cycling to the next feature without the need to readjust the feature. Accordingly, the time to reach a desired support level is capable of being reduced. Further, with a reduced number of physical controls (e.g., buttons), the system is less complex than those of the prior art and provides a less costly system. The control features are also capable of being integrated into a single system with a single pump, thus further reducing manufacturing and system costs.

Hereinabove, although the present disclosure is described by specific matters such as concrete components, and the like, the exemplary embodiments, and drawings, they are provided merely for assisting in the entire understanding of the present disclosure. Therefore, the present disclosure is not limited to the exemplary embodiment. Various modifications and changes may be made by those skilled in the art to which the disclosure pertains from this description. Therefore, the spirit of the present disclosure should not be limited to the above-described exemplary embodiments, and the following claims as well as all technical spirits modified equally or equivalently to the claims should be interpreted to fall within the scope and spirit of the disclosure.

What is claimed is:

1. A method of adjusting a vehicle seat support system, comprising:
    receiving, by a controller, a user selection at an input device;
    detecting, by the controller, a mode indicated by the user selection from a plurality of modes;
    adjusting, by the controller, seat support features within a vehicle seat toward a support characteristic defined by the detected mode;
    for each of the support features within the vehicle seat, setting, by the controller, a target intensity as the support characteristic based on the detected mode;
    increasing, by the controller, the target intensity level for a selected mode by one level when the user selection is an adjustment mode from among the plurality of modes; and
    decreasing, by the controller, the target intensity level for a last selected mode by one level when the user selection is an off mode from among the plurality of modes.

2. The method of claim 1, wherein the seat support features are adjusted until the target intensity is reached or until an engagement of the input device is released.

3. The method of claim 2, further comprising:
    receiving, by the controller, feedback from a sensor that detects pressure exerted onto the vehicle seat; and
    determining, by the controller, which of the seat support features to adjust based on the feedback.

4. The method of claim 2, further comprising:
    in response to the release of the input device engagement, storing, by the controller, a last selected mode,
    wherein the vehicle seat support system restarts based on a last intensity level.

5. The method of claim 4, wherein a plurality of modes are stored in a database, wherein an activation order of each seat support feature is defined in the database for each of the modes.

6. The method of claim 5, wherein the database further defines weighting rank factors used to calculate an effective system state, a number of intervals to reach a maximum intensity level, and target support levels for each seat support feature at each intensity interval.

7. The method of claim 1, wherein the seat support features are adjusted pneumatically or mechanically.

8. The method of claim 1, wherein the modes comprise at least one adjustment mode and an off mode.

9. The method of claim 8, wherein the adjustment mode includes at least a sport mode, a touring mode, and a back health mode.

10. A method of adjusting a vehicle seat support system, comprising:
    receiving, by a controller, a user selection at an input device;
    detecting, by the controller, a mode indicated by the user selection from a plurality of modes;
    calculating, by the controller, a weighted rank of each of a plurality of seat support features within a vehicle seat by comparing a current intensity level of each seat support feature and an intensity level of a respective seat support feature for the detected mode;
    calculating, by the controller, an effective system state based on the detected mode and the weighted rank of each seat support feature;
    setting, by the controller, a target intensity level based on the user selection; and
    adjusting, by the controller, the intensity of each seat support feature to meet the target intensity level for each seat support feature;
    wherein the calculation of the effective system state includes:
    increasing, by the controller, the target intensity level for a selected mode by one level when the user selection is an adjustment mode from among the plurality of modes; and
    decreasing, by the controller, the target intensity level for a last selected mode by one level when the user selection is an off mode from among the plurality of modes.

11. The method of claim 10, wherein the intensity of each seat support feature is adjusted until an engagement of the input device is released.

12. The method of claim 10, wherein a support profile is generated for a plurality of mode types to provide an intensity level for each seat support feature corresponding to each mode type.

13. The method of claim 11, further comprising:
    storing, by the controller, the current intensity level in response to the release of the input device engagement; and
    restarting, by the controller, the vehicle seat support system at the stored intensity level.

14. The method of claim 10, wherein the adjustment mode includes at least a sport mode, a touring mode, and a back health mode.

* * * * *